United States Patent [19]

Karino et al.

[11] 4,147,548

[45] Apr. 3, 1979

[54] PHOTOGRAPHIC ELEMENT COMPRISING QUATERNARY NITROGEN POLYMERIC MORDANT

[75] Inventors: Yukio Karino; Taku Nakamura, both of Minami-ashigara, Japan

[73] Assignee: Fuji Photo Film Co., Ltd., Minami-ashigara, Japan

[21] Appl. No.: 897,456

[22] Filed: Apr. 18, 1978

[30] Foreign Application Priority Data

Apr. 18, 1977 [JP] Japan .................................. 52-44349

[51] Int. Cl.$^2$ .................... G03C 7/00; G03C 1/40; G03C 5/54; G03C 1/84
[52] U.S. Cl. ................................. 96/77; 96/3; 96/29 D; 96/84 A; 96/119 R; 428/500; 428/522
[58] Field of Search ............ 96/77, 84 A, 114, 3, 96/29 D, 119 R; 526/23, 310; 101/464; 428/500, 522

[56] References Cited

U.S. PATENT DOCUMENTS 3,958,995  5/1976  Campbell et al. .................... 96/77

Primary Examiner—Richard L. Schilling
Attorney, Agent, or Firm—Sughrue, Rothwell, Mion, Zinn and Macpeak

[57] ABSTRACT

A photographic element comprising a support having thereon at least one layer containing a polymeric mordant containing a repeating unit represented by the general formula (I):

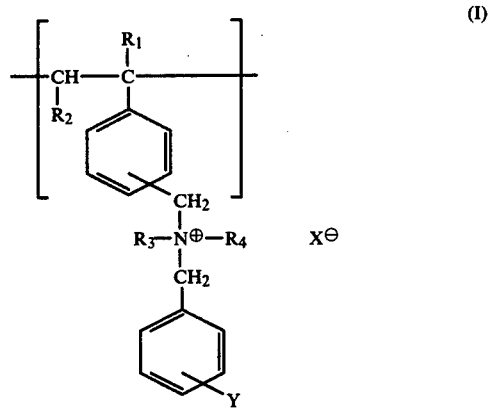

wherein $R_1$ and $R_2$, which may be the same or different, each represents a hydrogen atom or a lower alkyl group having 1 to 6 carbon atoms; $R_3$ and $R_4$, which may be the same or different, each represents a methyl group or an ethyl group; Y represents a halogen atom, a nitro group, a cyano group, a methoxy group, a methoxycarbonyl group or an ethylthio group; and $X^\ominus$ represents an anion.

7 Claims, No Drawings

PHOTOGRAPHIC ELEMENT COMPRISING QUATERNARY NITROGEN POLYMERIC MORDANT

BACKGROUND OF THE INVENTION

1. Field of the Invention

The present invention relates to novel polymeric compounds which are good mordants for dyes used in photographic systems and also to photographic systems using such polymeric compounds.

2. Description of the Prior Art

It is well known in the photographic field to use various polymeric compounds as mordants for preventing the migration of dyes and some water-insoluble polymeric mordants showing an excellent mordanting effect for dyes are described in U.S. Pat. No. 3,898,088. However, these conventional mordants have a poor ability to maintain the mordanted dyes in a stable form. That is, it has been found that when a photographic system containing dyes mordanted with such known mordants is exposed to light from a fluorescent lamp or to sunlight, the mordanted dyes readily change chemically or decompose. The chemical change or decomposition of the mordanted dyes by light is due to the inability of the mordants to maintain the dyes in a stabilized state and as a result the properties of the dye images formed become very poor and the density of the dyes is reduced. Thus, it has been desired to develop mordants which receive the transferred mordant images, stabilize the mordanted dyes, and cause less chemical change of decomposition of the mordanted dyes by light to occur.

SUMMARY OF THE INVENTION

An object of this invention is to provide dye mordanting polymers having improved properties.

Another object of this invention is to provide novel photographic elements containing mordants having excellent ability to maintain the mordanted dyes in a stable condition.

Still another object of this invention is to provide novel photographic elements containing mordants capable of receiving dye images which do not cause a chemical change in or decomposition of the dyes by the action of light to occur.

A further object of this invention is to provide a novel method of preparing photographic elements containing mordants having excellent properties.

Another object of this invention is to provide a photographic element comprising a support, at least one silver halide emulsion layer, and at least one layer comprising a mordanting composition having excellent properties.

Still another object of this invention is to provide an integral negative receiving photographic element comprising a support having a layer containing a polymeric mordant which provides excellent characteristics and at least one silver halide photographic emulsion layer which is associated with a layer containing a dye image-providing material.

The above-described objects of this invention are accomplished using a dye mordant which is a polymer containing a repeating unit represented by the formula (I):

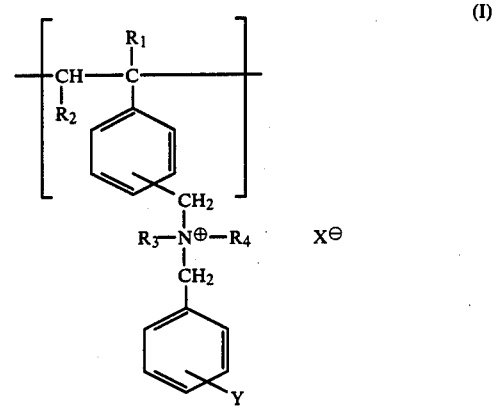

wherein $R_1$ and $R_2$, which may be the same or different, each represents a hydrogen atom or a lower alkyl group having 1 to 6 carbon atoms (such as a methyl group, an ethyl group, a propyl group, a butyl group, an amyl group, and a hexyl group and, preferably each represents a hydrogen atom, a methyl group or an ethyl group); $R_3$ and $R_4$, which may be the same or different, each represents a methyl group or an ethyl group; Y represents a halogen atom (such as a fluorine atom, a chlorine atom, a bromine atom, and an iodine atom), a nitro group, a cyano group, a methoxy group, a methoxycarbonyl group or an ethylthio group; and $X^\ominus$ represents an anion.

DETAILED DESCRIPTION OF THE INVENTION

As described above, Y in formula (I) is a halogen atom, a nitro group, a cyano group, a methoxy group, a methoxycarbonyl group or an ethylthio group and when Y is one of these substituents, it is preferred for the number of carbon atoms of the substituent to be 0 to 2.

Examples of anions shown by $X^\ominus$ in the formula (I) are a halogen ion (e.g., a chlorine ion, a bromine ion, and an iodine ion), an alkyl sulfate ion (e.g., a methyl sulfate ion and an ethyl sulfate ion), an alkyl or aryl sulfonate ion (e.g., methane sulfonate ion, ethane sulfonate ion, benzene sulfonate ion and para-toluene sulfonate ion), etc.

In a preferred embodiment, $R_1$ in the formula (I) indicated above is a hydrogen atom or a methyl group and $R_2$ is a hydrogen atom. It is particularly preferred for $R_1$ and $R_2$ in the formula (I) to be a hydrogen atom.

Preferably at least one of $R_3$ and $R_4$ of the formula (I) is a methyl group and it is particularly preferred for both $R_3$ and $R_4$ to be a methyl group.

Furthermore, it is preferred for Y in the formula (I) to be a halogen atom, particularly a chlorine atom.

The polymeric mordant of this invention may be a homopolymer of repeating units shown by the formula (I) or a copolymer thereof with another hydrophobic monomer copolymerizable therewith. In a preferred embodiment, more than one-fourth, preferably one-third to two-thirds, of the repeating units of the copolymer comprise repeating units of the formula (I) described above. A suitable molecular weight for the homopolymer of repeating units shown by the formula (I) and the copolymer thereof with another hydrophobic monomer is about 5,000 to about 1,000,000, preferably 10,000 to 200,000.

Typical hydrophobic monomers which can be used to form the copolymers (including two, three or more repeating units) of this invention are ethylenically unsaturated compounds and examples include monoethylenically unsaturated compounds such as ethylene, propylene, 1-butene, styrene, α-methylstyrene, divinylbenzene; monoethylenically unsaturated esters of aliphatic acids such as vinyl acetate, allyl acetate, etc.; ethylenically unsaturated mono- or dicarboxylic acid esters such as methyl acrylate, methyl methacrylate, ethyl acrylate, etc.; ethylenically unsaturated monocarboxylic acid or dicarboxylic acid amides such as acrylamide, N,N-dimethylmethacrylamide, etc.; monoethylenically unsaturated nitrile compounds such as acrylonitrile, etc.; and dienes such as butadiene, isoprene, etc. A preferred group of the ethylenically unsaturated hydrophobic monomers which can be used to form the copolymers of this invention include styrene, methyl methacrylate, etc.

The mordant polymers of this invention can be prepared by polymerizing a quaternary ammonium salt monomer having the following formula (II):

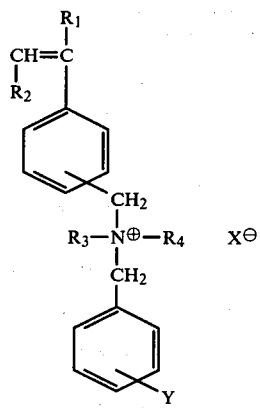

(II)

wherein $R_1$, $R_2$, $R_3$, $R_4$, Y and $X^{\ominus}$ have the same meaning as in the general formula (I); individually or by directly copolymerizing a quaternary ammonium salt monomer having the formula (II) with one or more of the ethylenically unsaturated hydrophobic monomers described above.

Furthermore, the mordants of this invention can be also prepared by quaternizing a polymer having therein repeating units at least one of which has the formula (III):

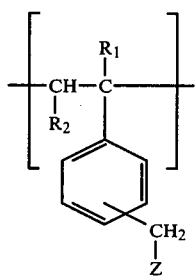

(III)

wherein $R_1$ and $R_2$ have the same meaning as in the formula (I) and Z represents a halogen atom; with a tertiary amine having the formula (IV):

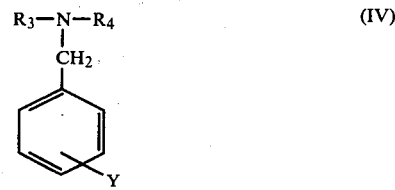

(IV)

wherein $R_1$, $R_2$ and Y have the same meaning as in the formula (I).

Examples of polymers of the formula (III) which can be reacted with the tertiary amines of the formula (IV) include poly(vinylbenzyl chloride) and copolymers of vinylbenzyl chloride and other ethylenically unsaturated monomers (such as styrene and methyl methacrylate).

Typical examples of suitable tertiary amines of the formula (IV) used for forming the mordants of this invention include p-methoxybenzyldimethylamine, m-methoxybenzyldimethylamine, p-fluorobenzyldimethylamine, p-chlorobenzyldimethylamine, p-chlorobenzyldiethylamine, m-chlorobenzyldimethylamine, m-chlorobenzyldiethylamine, p-nitrobenzyldimethylamine, m-nitrobenzyldimethylamine, etc. Many of these tertiary amines are commercially available.

The quaternization reaction can be carried out, e.g., as described in U.S. Pat. No. 3,898,088, at room temperature (e.g., about 20° to about 25° C.) or under heating using water, acetone, dimethylformamide, dimethyl sulfoxide, or an alcohol (such as methanol, ethanol, benzyl alcohol, 2-ethoxyethanol, etc.) as the solvent. The quaternization reaction is preferably carried out at a temperature of about 25° to about 100° C. for about 0.2 to about 8 hours. The reaction can be carried out using substantially equimolar amounts of, for example, a poly(vinylbenzyl halide), etc., and a tertiary amine of the formula (IV) above.

Examples of the mordant polymers of this invention are shown below. (Illustrated polymers shown include the following repeating units at the molar ratio shown by x:y.)

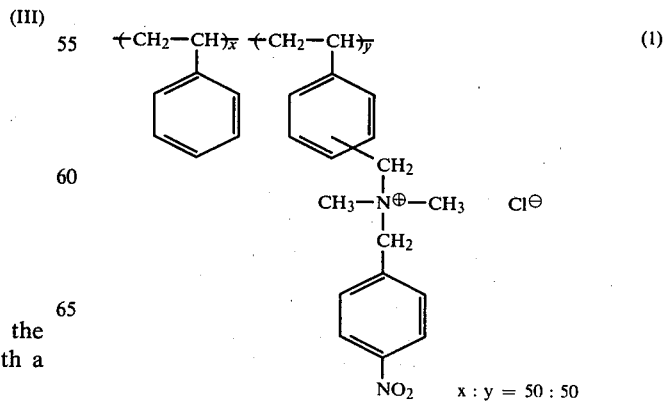

(1)

x : y = 50 : 50

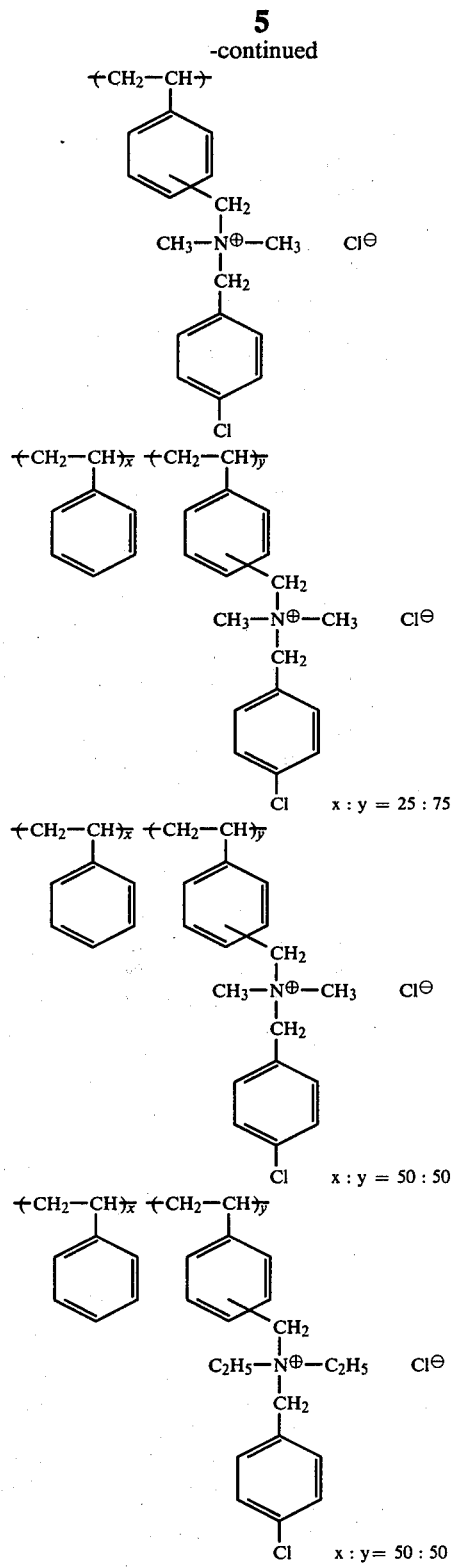

To prepare the polymeric mordants of this invention the homopolymerization of the monomer of the formula (II) or the copolymerization of the monomer of the formula (II) and one or more other ethylenically unsaturated monomers described above may be carried out using conventional methods, such as block polymerization, solution polymerization and bead polymerization and in this case, known catalysts in the art, such as ultraviolet light, peroxides (e.g., benzoyl peroxide), azo compounds (e.g., 2,2'-azobis(2-methylpropionitrile)), etc., may be employed. Hereinafter, homopolymers containing repeating units of the formula (I) above and copolymers containing therein repeating units of the formula (I) above and other repeating units will be designated "polymeric mordants of this invention" for brevity.

The novel polymeric mordants of this invention can be used for the color diffusion transfer process and also can be used as mordants for dyeing interlayers or as mordants for dyeing antihalation layers of the type as described in U.S. Pat. No. 3,282,699.

The novel polymeric mordant of this invention may be used individually to form a layer or may be used together with a natural or synthetic hydrophilic polymer used generally in the photographic field, such as gelatin, polyvinyl alcohol, polyvinyl pyrrolidone, etc. Moreover, two or more kinds of polymeric mordants of this invention can be used together in a single layer or one or more polymeric mordants of this invention can be employed in two or more layers. Also, the polymeric mordants of this invention can be used in admixture with other mordants in the same layer or in separate layers of the same element. Still further, the polymeric mordants of this invention can be used in an excess dye capturing mordanting layer as described in U.S. Pat. No. 3,930,864.

The amount of the polymeric mordants used can be readily determined depending on the amount of the dyes to be mordanted, the kind and composition of the polymeric mordant, and, further, the image forming process employed but the amount is preferably about 20 to about 80% by weight of the mordanting layer and the coverage of the polymeric mordant is preferably about 0.5 to about 8 g/m².

The polymeric mordants of this invention can be coated as a solution in an organic solvent such as methanol, ethanol, etc., or a mixed solvent of water-methanol, water-ethanol, etc., and these and other solvents may be desirably selected depending on the kind and amount of hydrophilic colloid used together with the polymeric mordants.

Other materials which can be used for the color diffusion transfer photographic process in this invention are explained below.

The silver halide emulsion used in this invention is a dispersion in a hydrophilic colloid solution of silver chloride, silver bromide, silver chlorobromide, silver iodobromide, silver chloroiodobromide, or a mixture thereof and the halogen composition of the silver halide is selected depending on the end-use purpose of the photographic materials and the processing conditions for the photographic materials but a silver iodobromide emulsion or a silver chloroiodobromide emulsion containing from about 1 mol% to about 10 mol% iodide (the content of chloride being less than about 30 mol%), and the remainder of the silver halide being bromide is particularly preferred. The grain size of the silver halide used may be an ordinary grain size or a fine grain size but silver halide grains having a mean grain size of from about 0.1 micron to about 2 microns are preferably used. Furthermore, the crystal form of the silver halide grains used may be that of a cubic system, an octahedral system, or a mixed crystal system of these systems. These silver halide emulsions can be prepared by conventional methods as described in, for example, P. Glafkides, *Chimie Photographique*, 2nd Edition, Chapters 18-23, Paul Montel, Paris (1957).

It is desirable for the silver halide emulsions used in this invention to be chemically sensitized by a heat treatment using the natural sensitizers contained in gelatin; a sulfur sensitizer such as sodium thiosulfate and N,N,N'-triethylthiourea; a gold sensitizer such as a thiocyanate complex salt of monovalent gold and a thiosulfate complex salt of monovalent gold; or a reductive sensitizer such as stannous chloride and hexamethylenetetramine.

Silver halide emulsions capable of readily forming latent images on the surface of the grains can be used in this invention, but it is preferred to use direct reversal silver halide emulsions of the internal latent image forming type as described in U.S. Pat. Nos. 2,497,875, 2,588,962, 2,456,953, 3,761,276, 3,206,313, 3,317,332, 3,761,266, 3,850,637, 3,923,513, 3,736,140, 3,761,267 and 3,854,949.

The silver halide emulsions used in this invention can be stabilized using conventional stabilizers. Furthermore, the silver halide emulsions used in this invention may further contain a sensitizing compound such as a polypropylene oxide compound.

Moreover, the silver halide emulsions used in this invention may be, if desired, spectrally sensitized. Examples of useful spectral sensitizers are cyanines, merocyanines, holopolarcyanines, styryls, hemicyanines, oxanoles, hemioxanoles, etc. Specific examples of spectral sensitizers which can be used in this invention are described in, for example, P. Glafkides, *Chimie Photographique*, 2nd Edition, Chapters 35 to 41, Paul Montel, Paris (1957) and F. M. Hamer, *Cyanine Dyes and Related Compounds*, Interscience Publications. In these spectral sensitizers, the cyanines in which the nitrogen atom of the basic heterocyclic nucleus is substituted with an aliphatic group (e.g., an alkyl group) having a hydroxyl group, a carboxyl group, or a sulfo group, for example, as described in U.S. Pat. Nos. 2,503,776, 3,459,553 and 3,177,210 are particularly useful for the practice of this invention.

Dye image-providing materials for the diffusion transfer process used together with the above-described silver halide photographic emulsions in this invention are described in, for example, U.S. Pat. Nos. 3,227,551, 3,227,554, 3,443,939, 3,443,940, 3,658,524, 3,698,897, 3,725,062, 3,728,113, 3,751,406, 3,929,760, 3,931,144 and 3,932,381, British Pat. Nos. 840,731, 904,364 and 1,038,331, West German Patent Application (OLS) Nos. 1,930,215, 2,214,381, 2,228,361, 2,242,762, 2,317,134, 2,402,900, 2,406,626 and 2,406,653, and Japanese Patent Application (OPI) Nos. 114,424/74, 126,332/74, 33,826/73, 126,331/74, 115,528/75, 113,624/76 and 104,343/76 (the term "OPI" as used herein refers to a "published unexamined Japanese patent application", hereinafter the same). Of these materials, dye image-providing materials of the type which are originally non-diffusible but release a diffusible dye by the cleavage thereof after undergoing a redox reaction with the oxidation product of a developing agent (hereinafter, dye image-providing materials of this type are referred to as DRR compounds) are preferred.

Specific examples of DRR compounds are, in addition to those described in the above-indicated patents or patent applications, magenta dye image-forming materials such as 1-hydroxy-2-tetramethylenesulfamoyl-4-[3'-methyl-4'-(2''-hydroxy-4''-methyl-5''-hexadecyloxyphenylsulfamoyl)phenylazo]naphthalene and yellow dye-forming materials such as 1-phenyl-3-cyano-4-{3'-[2''-hydroxy-4''-methyl-5''-(2''',4'''-di-t-pentylphenoxyacetamido)phenylsulfamoyl]phenylazo}-5-pyrazolone.

Where DRR compounds are used in this invention, any silver halide developing agents which can cross-oxidize these compounds can be employed in this invention. Such developing agents may be incorporated in alkaline processing compositions (processing elements) or in appropriate layers of photosensitive elements. Examples of developing agents which can be used in this invention are hydroquinone and aminophenols such as N-methyl-aminophenol, 1-phenyl-3-pyrazolidone, 1-phenyl-4,4-dimethyl-3-pyrazolidone, 1-phenyl-4-methyl-4-hydroxymethyl-3-pyrazolidone, N,N-diethyl-p-phenylenediamine, 3-methyl-N,N-diethyl-p-phenylenediamine, 3-methoxy-N-ethoxy-p-phenylenediamine, etc. Of these developing agents, the use of black-and-white developing agents having the property of reducing the formation of stain in the image-receiving layers (mordant layers) is particularly preferred.

In the practice of this invention, when the so-called ordinary silver halide emulsions which undergo development depending on the amount of exposure are used with DRR compounds, the transferred image forms a negative image and the remaining image forms a positive image. On the other hand, when the so-called direct reversal silver halide emulsions which are developed at the unexposed regions (e.g., when internal latent image type silver halide emulsions or solarization type silver halide emulsions are employed) are used, a positive image is obtained at the image-receiving layer of the film unit.

The above-described solarization type silver halide emulsions used preferably in this invention are described in, for example, C. E. K. Mees, *The Theory of the Photographic Process*, pages 261–297, Macmillan Co., New York (1942). Processes for preparing solarization type silver halide emulsions are described in, for example, British Pat. Nos. 443,245 and 462,730 and U.S. Pat. Nos. 2,005,837, 2,541,472, 3,367,776, 3,501,305, 3,501,306 and 3,501,307.

Internal latent image type direct positive silver halide emulsions which can be used advantageously in this invention are also described in U.S. Pat. No. 3,761,276 described above.

By developing direct reversal photographic silver halide emulsions, after image-wise exposure, in the presence of a fogging agent or by fogging the direct reversal photographic silver halide emulsions using an overall exposure (the overall exposure may be a short exposure under a high illumination, that is, an exposure shorter than $10^{-2}$ second, or may be a long exposure under low illumination) and a surface development processing after image-wise exposure, direct positive images can be obtained. However, it is preferred to use a fogging agent since the fogging extent can be easily controlled. The fogging agent may be incorporated in the photographic material or in the developer but the fogging agent preferably is incorporated in the photographic material. Typical examples of fogging agents for this type of silver halide emulsion are hydrazines as described in U.S. Pat. Nos. 2,588,982 and 2,568,785; hydrazide and hydrazone as described in U.S. Pat. No. 3,227,552; the quaternary salt compounds as described in British Pat. No. 1,283,835, Japanese Patent Publication No. 38,164/74, and U.S. Pat. Nos. 3,734,738, 3,719,494 and 3,615,615; and acylhydrazinophenylthiourea compounds as described in German Patent Application (OLS) No. 2,635,316.

The amount of the fogging agent used in this case can be varied over a wide range depending on the desired purpose. Where the fogging agent is used in a photographic material, the amount of the fogging agent will depend upon the kind of fogging agent used but, generally, is about 0.1 mg to about 1,500 mg per mol of silver, preferably 0.5 mg to 700 mg per mol of silver.

Where the fogging agent is incorporated in a developer, the amount of the fogging agent generally is about 0.05 to about 5 g, preferably from 0.1 to 1 g, per liter of the developer.

Where the fogging agent is incorporated in a layer of a photographic material, the fogging agent is preferably non-diffusible. The fogging agent can be rendered non-diffusible by bonding a ballast group usually used for couplers to the fogging agent.

Furthermore, transferred positive images can be obtained using the DIR reversal silver halide emulsion system as described in U.S. Pat. Nos. 3,227,551, 3,227,554 and 3,364,002 or the reversal silver halide emulsion system using solution physical development as described in British Patent 904,364. A series of processes for obtaining color diffusion transfer photographic images are described in U.S. Pat. Nos. 3,227,550 and 3,227,552 and British Pat. No. 1,330,524.

Typical examples of color developing agents which can be used in the case of using diffusible dye releasing couplers in this invention are the para-phenylenediamine derivatives described in U.S. Pat. Nos. 3,227,552, 2,559,643 and 3,813,244. Furthermore, the p-aminophenol derivatives as described in Japanese Patent Application (OPI) No. 26,134/73 may be advantageously used in this invention. Such a color developing agent is preferably incorporated in an alkaline developing composition contained in a rupturable container. The color developing agent may be incorporated in a layer additionally formed in the negative portion of the film unit or may be incorporated in a silver halide emulsion layer.

The photosensitive element used in this invention includes a support which does not undergo large dimensional deformation during processing. Examples of such supports are cellulose acetate films, polystyrene films, polyethylene terephthalate films, polycarbonate films, etc., which are used for ordinary photographic materials. Other effective supports are papers and papers laminated with a polymer such as polyethylene.

The processing composition used in this invention is a liquid processing composition containing the processing components necessary for the development of silver halide emulsions and the formation of dye images by diffusion transfer. The main solvent of the liquid processing composition is water and it may also contain a hydrophilic solvent such as methanol and methyl Cellosolve. The liquid processing composition further contains a sufficient amount of alkali for maintaining the necessary pH for causing development of the silver halide emulsion layers and neutralizing acids (e.g., hydrohalic acids such as hydrobromic acid and carboxylic acids such as acetic acid) formed during the steps of development and dye image formation. Examples of alkalis which can be used for the purpose are alkali metal hydroxides or salts, alkaline earth metal hydroxides or salts, or amines such as lithium hydroxide, sodium hydroxide, potassium hydroxide, a dispersion of calcium hydroxide, tetramethylammonium hydroxide, sodium carbonate, sodium tertiary phosphates, diethylamine, etc. It is preferred for the liquid processing composition to contain an alkali metal hydroxide at a concentration capable of maintaining the pH thereof above about 12, particularly above about 14 at room temperature.

The liquid processing composition, more preferably, also contains a hydrophilic polymer of a high molecular weight, such as polyvinyl alcohol, hydroxyethylcellulose, sodium carboxymethylcellulose, etc. The polymer thus incorporated in the liquid processing solution not only imparts to the liquid processing solution a viscosity in excess of 1 poise, preferably 500 to 1,000 poises, at room temperature which facilitates the uniform spreading of the liquid processing composition at development but also which forms a non-fluid film when the liquid processing composition is concentrated by the transfer of the aqueous solvent into the photosensitive element and the image-receiving element during the process of development, which assists to integrate the film unit after processing. The polymer film contributes, after the formation of dye images by diffusion transfer has been substantially finished, to prevent a change in the color images by suppressing a further transfer of coloring components into the image-receiving element.

Furthermore, as the case may be, the liquid processing composition used in this invention advantageously can contain a light absorbent such as titanium dioxide, carbon black, a pH indicating dye, etc., or the desensitizers as described in U.S. Pat. No. 3,579,333 for preventing the silver halide emulsion layers from being fogged by external light during processing. Moreover, a development inhibitor such as benzotriazole, etc., may be also incorporated in the liquid processing composition.

The processing composition described above preferably is retained in a rupturable container as described in U.S. Pat. Nos. 2,543,181, 2,643,886, 2,653,732, 2,723,051, 3,056,491, 3,056,492 and 3,152,515.

The photographic film unit of this invention, that is, the film unit, which is so constructed that it is processed by passing the film unit through a pair of juxtaposed pressing members, includes the following elements:

(1) a photosensitive element;

(2) an image-receiving element having a layer containing the polymeric mordant of this invention; and (3) a means of releasing an alkaline processing composition in the film unit, such as, for example, a rupturable container containing a silver halide developer.

The photosensitive element of the film unit described above is, after image-wise exposure, processed generally by spreading the liquid alkaline processing composition between the photosensitive element and the image-receiving element while they are superimposed in a face-to-face relationship. In this case, the image-receiving element may be separated from the photosensitive element after the dye image transfer is completed or the film unit may have a constitution that the color images are observed without separating the image-receiving element as is described in U.S. Pat. No. 3,415,645.

In another embodiment, the image-receiving element in the film unit described above may be integrated with the support and the silver halide photographic emulsion layers. For example, a film unit prepared by coating on a support, an image-receiving layer, a substantially opaque light-reflecting layer (e.g., a titanium dioxide-containing layer and a carbon black-containing layer), and a phososensitive layer comprising a single or a plurality of silver halide photographic emulsion layers, as is described in Belgian Pat. No. 757,960. After image-wise exposure, the photosensitive element is superposed on an opaque cover sheet (having associated therewith the neutralization system of this invention) in a face-to-face relationship and then the processing composition is spread between them.

Another embodiment of a superposed integrated type of film unit is disclosed in Belgian Pat. No. 757,959. In this embodiment, an image-receiving layer, a substantially opaque light-reflecting layer (e.g., a titanium dioxide layer and a carbon black layer as described above), and a single or a plurality of photosensitive silver halide emulsion layers are coated on a support and then a transparent cover sheet (having associated therewith the neutralization system of this invention) is superposed on the photosensitive layer in a face-to-face relationship. A rupturable container retaining a liquid alkaline processing composition including an opacifying agent (e.g., carbon black) is disposed close to the uppermost layer of the photosensitive silver halide emulsion layers and the transparent top cover sheet described above. The film unit having such a configuration is image-wise exposed through the transparent cover sheet in a camera and then the container retaining the liquid alkaline processing composition is ruptured by a pressing means on removal of the film unit from the camera, whereby the liquid alkaline processing composition (containing an opacifying agent) is spread between the photosensitive layer and the cover sheet. Thus, the film unit is light-shielded and the development proceeds.

Furthermore, other useful integrated embodiments wherein DRR compounds or diffusible dye releasing couplers can be used in this invention are described in U.S. Pat. Nos. 3,415,644, 3,415,645, 3,415,646, 3,647,487 and 3,635,707 and German Patent Application (OLS) No. 2,436,980.

A particularly preferred embodiment of this invention comprises an integrated-type negative image-receiving photographic element comprising a support having thereon at least one layer of the polymeric mordant containing a repeating unit represented by the general formula (I) above, at least one silver halide emulsion layer and a layer containing a dye image-providing material associated with the silver halide emulsion layer.

A feature of this invention is that the polymeric mordant having therein the unit represented by the formula (I) is capable of mordanting strongly dyes. Also, one of the most important features of this invention is that the polymeric mordant of this invention has not only an excellent capability of mordanting the dyes but also in causing less chemical change or decomposition by light of the dyes mordanted by the mordant of this invention to occur. Thus, when the mordanted dyes are dyes for color images, the dyes can be stored for a long period of time.

The invention is specifically described in greater detail by reference to the following examples. Unless otherwise indicated herein, all parts, percents, ratios and the like are by weight.

SYNTHESIS EXAMPLE

To 60 ml of a mixed solvent of dimethylformamide and ethanol (3:1 by volume ratio) were added 25.7 g of a copolymer of styrene and divinylbenzyl chloride (1:1 by mol ratio) and 19.8 g of p-nitrobenzylmethylamine and the mixture was heated to about 80° C. for 5 hours. The reaction mixture obtained was cooled and then poured into 600 ml of ethyl acetate. The precipitated solid thus-formed was collected, washed with ethyl acetate, and air-dried to provide 45 g of copoly(styrene-N-p-nitrobenzyl-N,N-dimethyl-N-vinylbenzylammonium chloride), Polymer 1 described above. The copolymer mordant thus-obtained had a reduced viscosity (in methanol) of 0.53 at 30° C. and at a concentration of 0.50 g/dl.

In the same manner as described above, other copolymer mordants, Polymers 2, 3, 4 and 5, described above, were obtained. The results of elementary analysis of these mordants are shown in Table A below together with the reduced viscosity values of the polymers.

Table A

| Polymer | | Elementary Analysis (%) | | | | Reduced Viscosity |
|---|---|---|---|---|---|---|
| | | C | H | N | Cl | |
| 1 | C* | 71.45 | 6.70 | 6.41 | 8.11 | 0.53 |
| | F* | 71.17 | 6.84 | 6.43 | 7.98 | |
| 2 | C | 67.07 | 6.58 | 4.35 | 22.00 | 2.11 |
| | F | 66.34 | 6.14 | 4.48 | 23.03 | |
| 3 | C | 69.52 | 6.70 | 3.92 | 19.86 | 0.61 |
| | F | 69.25 | 6.84 | 4.59 | 19.31 | |
| 4 | C | 73.22 | 6.87 | 3.29 | 16.63 | 0.54 |
| | F | 73.95 | 6.98 | 3.36 | 15.71 | |
| 5 | C | 73.99 | 7.33 | 3.08 | 15.60 | 0.50 |
| | F | 74.11 | 6.99 | 3.39 | 15.52 | |

*C: Calculated value
F: Found value

EXAMPLE 1

An image-receiving element prepared by coating on a transparent polyethylene terephthalate support each of the polymeric mordants shown in Table 1 below and gelatin at coverages of 2 g/m$^2$ and 2 g/m$^2$, respectively, was dyed with the yellow dye shown below to the extent that the yellow transmission density became about 1.

Yellow Dye:

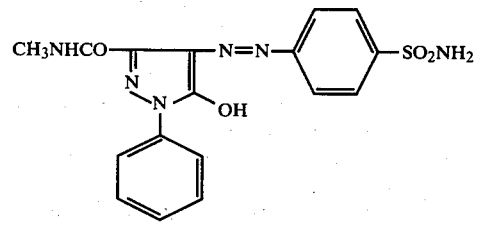

Then, the dyed film was immersed in a Briton-Robinson buffer solution in a cell of 2 mm and after 3 minutes, the transmission absorption spectrum thereof was measured using a 323-Type spectrophotometer made by Hitachi Ltd. From the hydrogen ion concentration (pH) reliability of the absorption curve, the acid dissociation constant (pKa) of the hydroxyl group at the 5-position of the pyrazolone ring of the yellow dye was determined (based on the method of measuring acid dissociation constants described in *Jikken Kagaku Koza* (*Experimental Chemistry Course*) 5, "Thermal Measurement and Equilibrium", pages 470–471, (1958)).

At pH values below pKa, the image-receiving element was difficult to dye since dissociation of the yellow dye was restrained and charges were reduced, which show, therefore, that the mordants having a lower pKa show better mordanting power in a neutral state or a weakly acidic state.

Table 1

| Polymer | pKa |
|---|---|
| A (comparison) | 5.2 |
| 1 | 4.6 |
| 2 | 4.9 |
| 3 | 4.9 |
| 4 | 4.3 |
| 5 | 4.0 |

Compound A in the above table is a copolymer containing the following repeating units in the ratio shown below.

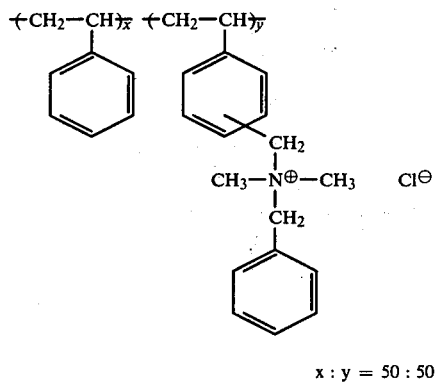

x : y = 50 : 50

As shown by the results in Table 1 above, the mordants of this invention exhibit a low pKa as compared with Comparison Mordant A and the results show that the introduction of substituent Y provides excellent mordanting power.

EXAMPLE 2

An image-receiving element prepared by coating on a transparent polyethylene terephthalate support each of the polymeric mordants shown in Table 2 below and gelatin at coverages of 2 g/m² and 2 g/m², respectively, was dyed with a magenta dye having the structure shown below:

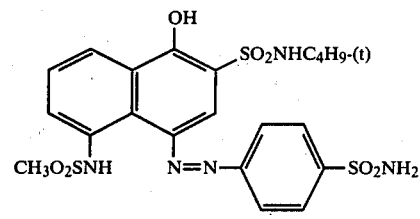

to the extent that the magenta transmission density became about 1 and the residual ratio of the dye after irradiation of the dyed film with light from a fluorescent lamp at 17,000 lux for 1 week was measured. The results obtained are shown in Table 2 below.

Table 2

| Polymer | Residual Dye Ratio (%) |
|---|---|
| B (comparison) | 25 |
| 4 | 48 |

Polymer B used was the polymer described in U.S. Pat. No. 3,898,088 containing the following repeating unit:

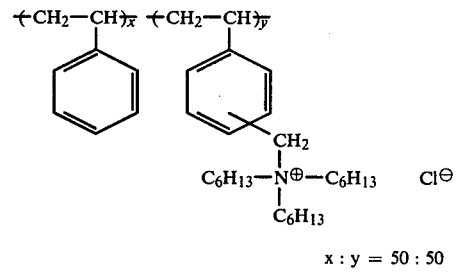

x : y = 50 : 50

From the above results, it is clear that the dye mordanted by the mordant of this invention has superior stability to light.

EXAMPLE 3

A photosensitive sheet was prepared by coating on a transparent polyethylene terephthalate support the following layers successively:

(1) A mordanting layer containing 3.0 g/m² of the mordant shown in Table 2 as Mordant 4 and 3.0 g/m² of gelatin.

(2) A white reflective layer containing 20 g/m² of titanium oxide and 2.0 g/m² of gelatin.

(3) A light-shielding layer containing 2.70 g/m² of carbon black and 2.70 g/m² of gelatin.

(4) A layer containing 0.50 g/m² of a cyan dye-providing material having the structure shown below:

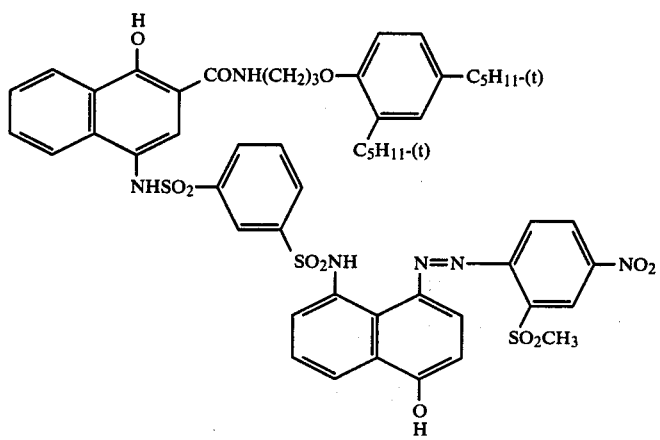

0.25 g/m² of diethyllaurylamide, and 1.14 g/m² of gelatin.

(5) A layer containing a red-sensitive internal latent image type direct reversal silver iodobromide emulsion (halogen composition of the silver halide: 2 mol% iodine) at a coverage of 1.9 g/m² of silver and a coverage of 1.4 g/m² of gelatin, a fogging agent having the structure shown below:

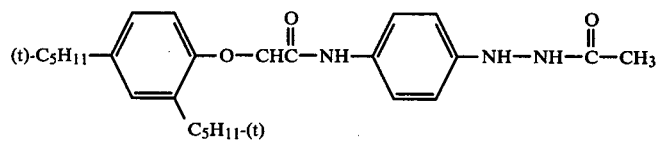

at a coverage of 0.028 g/m², and sodium dodecylhydroquinonesulfonate at a coverage of 0.13 g/m².

(6) A layer containing 2.6 g/m² of gelatin and 1.0 g/m² of 2,5-dioctylhydroquinone.

(7) A layer containing 0.45 g/m² of a magenta dye-providing material having the structure shown below:

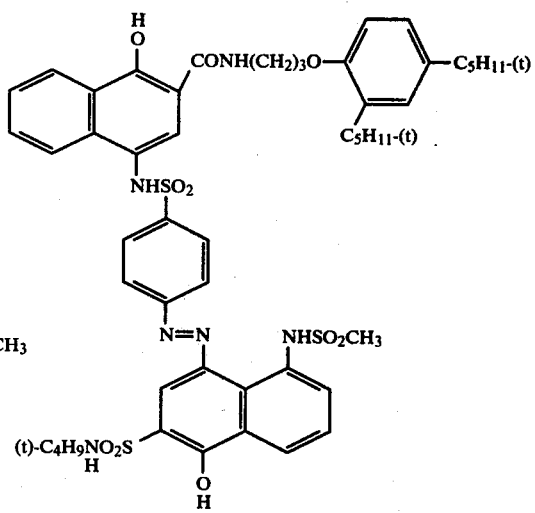

0.10 g/m² of diethyllaurylamide, 0.007 g/m² of 2,5-di-t-butylhydroquinone, and 0.76 g/m² of gelatin.

(8) A layer containing a green-sensitive internal latent image type direct reversal silver iodobromide emulsion (halogen composition of the silver iodobromide: 2 mol% iodine) at coverages of 1.4 g/m² of silver and 1.0 g/m² of gelatin, the fogging agent as used in Layer (5) at a coverage of 0.024 g/m², and sodium dodecylhydroquinonesulfonate at a coverage of 0.11 g/m².

(9) A layer containing 2.6 g/m² of gelatin and 1.0 g/m² of 2,5-dioctylhydroquinone.

(10) A layer containing 0.78 g/m² of a yellow dye-providing material having the structure shown below:

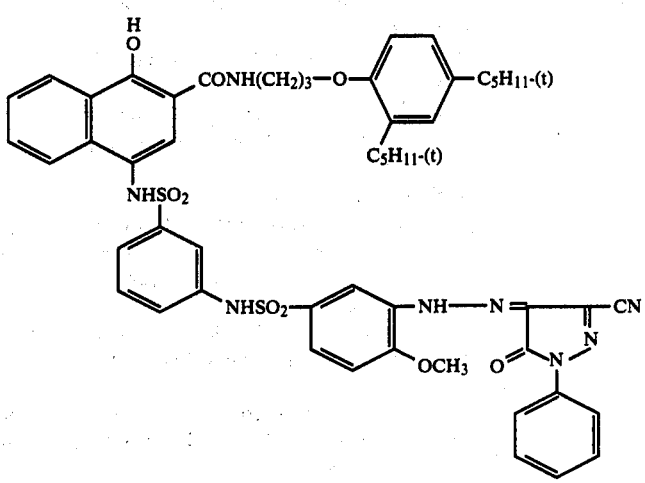

0.16 g/m² of diethyllaurylamide, 0.012 g/m² of 2,5-di-t-butylhydroquinone, and 0.78 g/m² of gelatin.

(11) A layer containing a blue-sensitive internal latent image type direct reversal silver iodide emulsion (halogen composition of silver iodobromide: 2 mol% iodine) at coverages of 2.2 g/m² of silver and 1.7 g/m² of gelatin, the fogging agent as used in Layer (5) at a coverage of 0.020 g/m² and sodium dodecylhydroquinonesulfonate at a coverage of 0.094 g/m².

(12) A layer containing 0.94 g/m² of gelatin.

| Processing Solution | |
|---|---|
| 1-Phenyl-4-methyl-4-hydroxymethyl-3-pyrazolidinone | 10 g |
| Methylhydroquinone | 0.18 g |
| 5-Methylbenzotriazole | 4.0 g |
| Sodium Sulfite (anhydrous) | 1.0 g |
| Sodium Carboxymethylcellulose | 40.0 g |
| Carbon Black | 150 g |
| Sodium Hydroxide (28% aq. soln.) | 200 ml |
| Water | 550 ml |

Cover Sheet

A cover sheet was prepared by coating on a polyethylene terephthalate support a neutralizing acid polymer layer containing polyacrylic acid (aqueous solution of 10% by weight thereof having a viscosity of about 1,000 cp) at a coverage of 15 g/m² of polyacrylic acid and further a neutralization timing layer containing 3.8 g/m² of acetylcellulose (degree of acetylation: 39.4% by weight, i.e., forming 39.4 g of acetyl group by the hydrolysis of 100 g of the acetylcellulose) and 0.2 g/m² of poly(styrene-maleic anhydride copolymer) (styrene:maleic anhydride molar ratio: about 60:40; molecular weight: about 50,000).

Processing

The cover sheet described above was superposed on the photosensitive sheet described above and after exposing to a color test chart through the cover sheet side, the processing solution described above was spread between both sheets at a thickness of 85 microns using a press roller. The processing was carried out at 25° C. One hour after the processing, the blue density, green density and red density of the color images formed in the image-receiving layer were measured through the transparent support of the photosensitive sheet using a Macbeth reflection densitometer. The results obtained are shown in Table 3 below.

Table 3

| | Reflection Density after One Hour | |
|---|---|---|
| | Maximum Density | Minimum Density |
| Blue Density | 1.67 | 0.32 |
| Green Density | 1.72 | 0.29 |
| Red Density | 1.88 | 0.37 |

As shown by the results in Table 3, good transferred color images were obtained.

EXAMPLE 4

A photosensitive sheet was prepared in the same manner as in Example 3 except that the mordant used in Layer (1) of the photosensitive sheet in Example 3 was replaced with Comparison Mordant B used in Example 2.

After exposing the photosensitive sheet prepared above and a photosensitive sheet produced as in Example 3 to blue, green and red lights, each of the photosensitive sheets was processed using a processing solution and a cover sheet produced as described in Example 3. One hour after the processing, the photosensitive sheet was separated, washed with water and dried.

Then, the photosensitive sheet was exposed to light from a fluorescent lamp at 17,000 lux for 4 days and thereafter the density reduction of the photosensitive sheet at the area where the intial reflection density was 1.2 was measured.

The residual ratios of yellow, magenta and cyan colors were measured and the results obtained are shown in Table 4 below.

Table 4

| | Dye Residual Ratio (%) | | |
|---|---|---|---|
| Mordant No. | Yellow | Magenta | Cyan |
| B (comparison) | 50 | 16 | 14 |
| 34 | 64 | 63 | 44 |

From the above results, it is clear that the mordant of this invention is superior in color image preservation properties to Comparison Mordant B.

While the invention has been described in detail and with reference to specific embodiments thereof, it will be apparent to one skilled in the art that various changes and modifications can be made therein without departing from the spirit and scope thereof.

What is claimed is:

1. A photographic element comprising a support having thereon at least one photographic layer containing a polymeric mordant containing a repeating unit represented by the general formula (I):

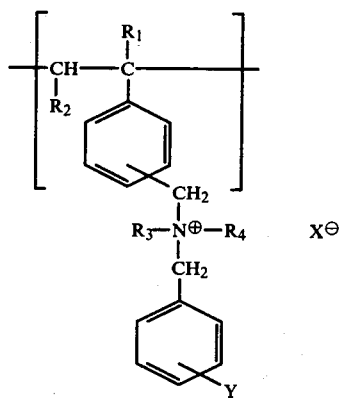

wherein $R_1$ and $R_2$ each represents a hydrogen atom; $R_3$ and $R_4$, which may be the same or different, each represents a methyl group or an ethyl group; Y represents a halogen atom or a nitro group; and $X^-$ represents an anion.

2. The photographic element of claim 1, wherein Y is a halogen atom.

3. The photographic element of claim 1, wherein $R_3$ and $R_4$ of the general formula (I) are a methyl group and Y is a chlorine atom.

4. The photographic element of claim 1, wherein said polymeric mordant is a copolymer containing the repeating unit represented by the general formula (I) and a repeating unit derived from at least one other ethylenically unsaturated hydrophobic monomer.

5. The photographic element of claim 4, wherein said other ethylenically unsaturated hydrophobic monomer is styrene.

6. The photographic element of claim 4, wherein said other ethylenically unsaturated hydrophobic monomer is methyl methacrylate.

7. An integrated type negative image-receiving photographic element comprising a support having thereon at least one layer containing the polymeric mordant containing a repeating unit represented by the general formula (I) of claim 1, at least one silver halide emulsion layer and a layer containing a dye image-providing material associated with said silver halide emulsion layer.

* * * * *